(12) United States Patent
Wang et al.

(10) Patent No.: US 12,128,774 B2
(45) Date of Patent: Oct. 29, 2024

(54) ELECTRIFIED VEHICLE HIGH VOLTAGE CONTACTOR CONTROL

(71) Applicant: Ford Global Technologies, LLC, Dearborn, MI (US)

(72) Inventors: Rui Wang, Irvine, CA (US); Wesley Edward Burkman, Dearborn, MI (US); Patterson Kaduvinal Abraham, Dearborn, MI (US); Ai Keramidas, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 399 days.

(21) Appl. No.: 17/847,603

(22) Filed: Jun. 23, 2022

(65) Prior Publication Data
US 2023/0415580 A1   Dec. 28, 2023

(51) Int. Cl.
*B60L 3/00* (2019.01)
*B60L 58/10* (2019.01)
*H01H 83/10* (2006.01)

(52) U.S. Cl.
CPC ........... *B60L 3/0084* (2013.01); *B60L 3/0046* (2013.01); *B60L 58/10* (2019.02); *H01H 83/10* (2013.01)

(58) Field of Classification Search
CPC ...... B60L 3/0084; B60L 3/0046; B60L 58/10; B60L 2210/10; B60L 1/00; B60L 50/60; B60L 53/14; B60L 53/16; H01H 83/10; H01H 3/001; H01H 47/18; H01H 47/002; Y02T 10/70; Y02T 10/7072; H02J 7/0045; H02J 7/0068
See application file for complete search history.

(56) References Cited

U.S. PATENT DOCUMENTS

| | | | |
|---|---|---|---|
| 8,103,460 B2 | 1/2012 | Chen et al. | |
| 2017/0246959 A1* | 8/2017 | Loftus | ........................ B60L 1/00 |
| 2020/0269718 A1 | 8/2020 | Isaksson | |
| 2021/0332782 A1 | 10/2021 | Gibson et al. | |
| 2022/0020546 A1* | 1/2022 | Delbaere | ................. H01H 47/32 |
| 2022/0216714 A1* | 7/2022 | Zhang | ..................... B60L 50/51 |
| 2023/0134808 A1* | 5/2023 | Wiegman | ................ B60L 53/62 |
| | | | 320/109 |

* cited by examiner

*Primary Examiner* — Richard M Camby
(74) *Attorney, Agent, or Firm* — Brooks Kushman PC; David B. Kelley

(57) ABSTRACT

An electrified vehicle includes a contactor having a coil operable by a low-voltage control signal to selectively electrically couple a terminal of a high-voltage bus to a charger receiving power from an external source. A programmed controller predicts the time it will take for the contactor to close after receiving a command based on the coil temperature and voltage of the command signal. The controller generates the low-voltage control signal responsive to a difference between bus voltage and charger voltage being less than a first threshold at the predicted closing time of the contactor. The control signal may also depend on the rate of change of the charger voltage being below a second threshold.

20 Claims, 4 Drawing Sheets

ELECTRIFIED VEHICLE HIGH VOLTAGE CONTACTOR CONTROL

TECHNICAL FIELD

This disclosure relates to controlling the opening/closing of high voltage contactors that connect a high voltage power bus of an electrified vehicle to another high voltage device, such as a battery charger.

BACKGROUND

Electrified vehicles include a high-voltage battery pack the powers various components via a high voltage bus. Electrical contactors or relays operated by an associated vehicle controller may be used to electrically connect/disconnect components to/from the high voltage bus. Closing a contactor when there is a large voltage difference between the bus and the device(s) being connected, or opening a contactor when a large current is flowing through the contactor, may result in heating or arcing and associated wear to the contactor. Because the contactor is an electrically controlled mechanical device, there is a small but finite and variable time delay between commanding the contactor to close and establishing stable physical contact between the connected electrical components.

SUMMARY

In various embodiments, an electrified vehicle comprises a contactor including a coil operable by a low-voltage control signal to selectively electrically couple a terminal of a high-voltage bus to a charger, and a controller programmed to predict a closing time of the contactor, and to generate the low-voltage control signal responsive to a difference between bus voltage and charger voltage being less than a first threshold at the predicted closing time of the contactor. The predicted closing time of the contactor may be based on at least one of coil temperature and control signal voltage. The controller may be programmed to retrieve the predicted closing time from a non-transitory computer readable storage medium having stored predicted closing times indexed by at least one of the coil temperature and the control signal voltage. The coil temperature may be measured or estimated. In one embodiment, the coil temperature is estimated based on a measured battery pack temperature. The coil temperature may be estimated based on the measured battery pack temperature and elapsed time from a vehicle key-off. The controller may be further programmed to generate the low-voltage control signal only if a rate of change of the charger voltage is less than a second threshold. The second threshold may vary based on the first threshold and the predicted closing time. In one embodiment, the second threshold corresponds to twice the first threshold divided by the predicted closing time. The controller may be further programmed to predict a charge voltage change during the closing time, wherein the control signal is generated when the charger voltage is equal to the bus voltage minus the charge voltage change.

Embodiments may also include a method for controlling an electrified vehicle, the method performed by a programmed vehicle controller. The method may include predicting a closing time of a contactor operable by a control signal to selectively electrically couple a terminal of a high-voltage vehicle bus and a charger, and generating the control signal to close the contactor in response to a difference between a high-voltage bus and a charger coupled to the electrified vehicle being less than an associated threshold at the predicted closing time. Predicting the closing time of the contactor may include predicting the closing time based on temperature of a coil of the contactor and voltage of the control signal. The predicted coil temperature may be based on vehicle battery pack temperature and elapsed time from a vehicle key-off. The method may also include predicting charger voltage at the predicted closing time.

In one or more embodiments, the control signal is generated in response to the difference between the high voltage bus and the charger being less than the associated threshold, and charger voltage variation being less than a second threshold, wherein the second threshold is based on the first threshold and the predicted closing time. The predicted closing time may be retrieved from a stored lookup table accessed by temperature of a coil of the contactor and voltage of the control signal.

Embodiments may also include an electrified vehicle having a high-voltage traction battery coupled to a high-voltage bus, a contactor including a coil operable by a low-voltage control signal to selectively electrically couple a first terminal of the high-voltage bus to a second terminal connectable to an external battery charger, and a controller programmed to generate the low-voltage control signal in response to: a difference between voltage of first terminal and the second terminal being less than a first threshold, and variation of voltage at the second terminal being less than a second threshold, wherein the second threshold is based on a predicted closing time of the contactor. The predicted closing time of the contactor may be predicted based on temperature of the coil and voltage of the control signal. The second threshold may be a multiple of the first threshold divided by the predicted closing time of the contactor. The temperature of the coil may be estimated based on temperature of the high-voltage traction battery.

One or more embodiments according to the disclosure may have associated advantages. For example, embodiments may reduce the time needed to close the bus contactor to connect an external charger while assuring that the voltage difference between the bus and charger is within a desired range to reduce or eliminate arcing, excessive heat, and associated wear of the contactor. Predicting the actual closing time based on vehicle and environmental operating conditions, such as coil temperature and command signal voltage increases robustness such that system operation is less susceptible to changes in performance due to variability of operating conditions and/or tolerances of corresponding components.

DETAILED DESCRIPTION

Figure 1:
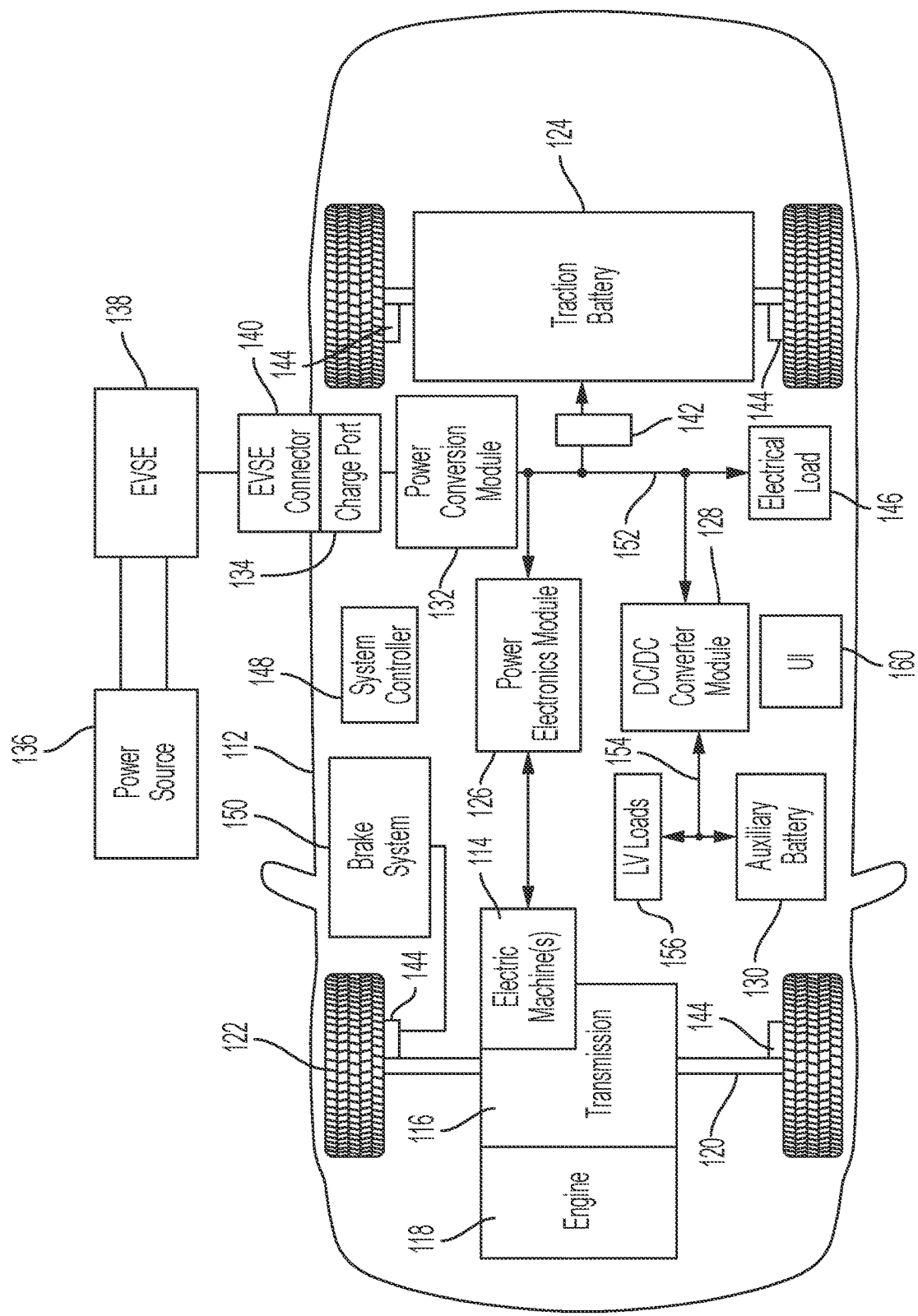
FIG. 1 is a block diagram of an electrified vehicle with contactor control using predicted contactor closing time.

Embodiments of the present disclosure are described herein. It is to be understood, however, that the disclosed embodiments are merely examples and other embodiments can take various and alternative forms. The figures are not necessarily to scale and may be simplified; some features could be exaggerated, minimized, or omitted to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described, but within the scope of the claimed subject matter. The combinations of features illustrated provide representative embodiments for typical applications. Various combinations and modifications of the features consistent with the teachings of this disclosure, however, could be desired for particular applications or implementations.

The present inventors have recognized that voltage variations across a contactor during the variable time delay between a closing signal and physical connection between components may result in an undesirable voltage difference across the contactor that may affect contactor wear and subsequent operation. The variable time delay may create uncertainty with respect to what the actual voltage difference will be when the contacts close due to variations in the charger voltage during the closing time. In addition, the present inventors have recognized that the time delay varies at least based on contactor coil temperature and voltage of the control signal. It is desirable to close the contactors only after a voltage difference between the connected components is less than a threshold that prevents arcing, high in-rush current, heating, etc. In a representative embodiment with a contactor connecting components with voltages of about 325 VDC, a desired voltage difference may be less than 5 VDC, for example. While voltage differences of 20 VDC may be acceptable if they rarely occur, higher voltage differences may result in undesirable cumulative effects on contactor performance.

Various embodiments may have associated advantages. For example, embodiments may reduce the time needed to close the bus contactor to connect an external charger while assuring that the voltage difference between the bus and charger is within a desired range to reduce or eliminate arcing and associated wear of the contactor. Predicting the actual closing time based on vehicle and environmental operating conditions, such as coil temperature and command signal voltage increases robustness with respect to voltage variation of the connected EVSE or charger, which may include voltage overshoot and/or oscillation. System operation is therefore less susceptible to changes in performance due to variability of operating conditions and/or tolerances of corresponding components.

FIG. 1 illustrates a representative electrified vehicle 112 implemented by a plug-in hybrid-electric vehicle (PHEV) for purposes of illustration and description. Those of ordinary skill in the art will recognize that contactor control as described herein may be used in other types of electrified vehicles, such as a battery electric vehicle (BEV) that does not include an engine 118. Similarly, the contactor control described herein be applied to commercial and transportation vehicles as well as other non-vehicle applications.

A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and regenerative braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. Similarly, contactor module 142 may include one or more contactors to connect or isolate power conversion module or charger 132 from the high-voltage bus 152 using a predicted contactor closing time as described herein. The high-voltage bus 152 may include power and return conductors for carrying current over the high-voltage bus 152. The contactor module 142 may be located in the traction battery 124. One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more controllers, such as system controller 148 may be powered by the low-voltage bus 154. Similarly, various vehicle actuators, including contactor module 142 may have low-voltage control signals powered by the low-voltage bus, or by drivers of an associated controller or I/O interface that provide low-voltage control signals. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

As generally understood by those of ordinary skill in the art, low-voltage components may have different voltage levels for operation, and different applications or implementations may utilize different voltage levels for similar components. Low-voltage generally refers to voltages less than 60 VDC (or 30 VAC) with some vehicles having a nominal 12V system, while others have 24V or 48V systems for powering convenience features and controllers. High-voltage generally refers to voltages greater than 60V and may range up to 1500V DC (or 1000 VAC), for example. Typical high-voltage traction batteries for passenger vehicles are in the range of 200-450 VDC while some commercial vehicles include traction batteries operating at 400-800 VDC.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may be electrically coupled to the contactor module 142 as previously described such that an associated controller controls closing of the associated contactor(s) within contactor module 142 using estimated contactor closing time to connect charger 132 to high voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Wheel brakes 144 may be provided for slowing the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144. The brake system 150 may respond to driver commands and may also operate autonomously to implement features such as stability control. The controller of the brake system 150 may implement a method of applying a requested brake force when requested by another controller or sub-function.

The electrified vehicle 112 may further include a human-machine interface (HMI) or user interface (UI) 160. The user interface 160 may provide a variety of display elements for communicating information to the operator. The user interface 160 may provide a variety of input elements for receiving information from the operator. The user interface 160 may include one or more displays. The displays may be touch-screen displays. The user interface 160 may include discrete lamps/lights. For example, the lamps may include light-emitting diodes (LED). The user interface 160 may include switches, rotary knobs, and buttons for allowing the operator to change various settings. The user interface 160 may include a control module that communicates via the vehicle network.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network. Additional channels of the vehicle network may include wired or wireless discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not explicitly shown in FIG. 1, but it may be implied that the vehicle network may connect to any electronic modules that are present in the vehicle 112. A vehicle system controller (VSC) 148 may be present to coordinate the operation of the various components.

While illustrated as a single controller, controller 148 generally represents multiple vehicle controllers that receive signals from associated sensors and control corresponding actuators. Controllers or control modules may be dedicated to a particular vehicle system, subsystem, or component and may include programmable microprocessor-based controllers and microcontrollers that perform various functions and algorithms based on stored program instructions. Various controllers may communicate over one or more channels of the vehicle network(s).

Figure 2:
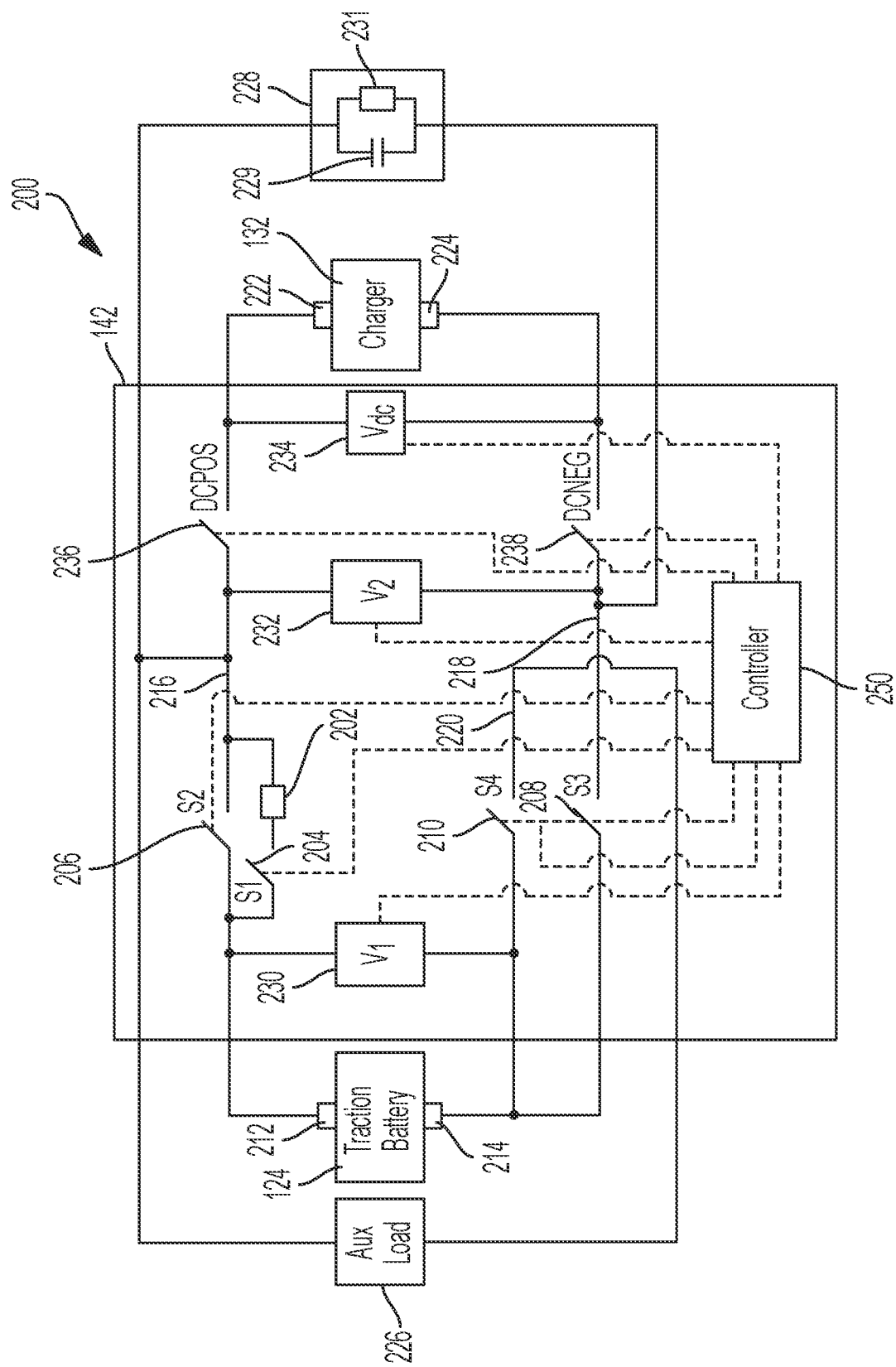
FIG. 2 depicts a possible configuration for contactors in a high-voltage power distribution system for a vehicle.

FIG. 2 depicts a configuration of a high-voltage power distribution system 200 for a vehicle 112. Referring to FIGS. 1 and 2, power distribution system 200 includes a contactor module 142 having a plurality of individually controllable contactors. The contactor module 142 may include a pre-charge contactor 204 (S1) that is electrically coupled in series with a precharge resistor 202. The precharge resistor 202 may limit the current flowing through the high-voltage bus 152 during startup when the traction battery 124 is initially connected to the high-voltage bus 152. The precharge contactor 204 may be configured to selectively couple a terminal of the traction battery 124 to the high-voltage bus 152 through the impedance element 202. The contactor module 142 may include a main contactor 206 (S2) that is configured to selectively electrically couple a positive terminal 212 of the traction battery 124 to a positive-side conductor 216 of the high-voltage bus 152. The contactor module 142 may include a high-voltage return contactor 208 (S3) that is configured to selectively electrically couple a traction battery return terminal 214 (return terminal of the traction battery 124) to a negative-side or return conductor 218 of the high-voltage bus 152 (e.g., return side of the power electronics module 126). The contactor module 142 may include an auxiliary load return contactor 210 (S4) that is configured to selectively electrically couple the traction battery return terminal 214 to an electrical load return conductor 220 to which an auxiliary load 226 may be connected.

The power distribution system 200 may also include an interface for the charger 132 to interface with the high-voltage bus 152. A charger positive contactor 236 may be electrically coupled between a charger positive terminal 222 and the positive-side conductor 216. As described in greater detail herein, various embodiments control closing of the charger positive contactor 236 based on a predicted or estimated closing time of the contactor. However, the control strategies described with reference to the charger positive contactor 236 may be applied to other contactors in the system, or in applications other than electrified vehicles. A charger return contactor 238 may be electrically coupled between a charger return terminal 224 and the return conductor 218. The charger contactors 236, 238 may be configured to selectively electrically couple terminals for connecting to a charger 132 to corresponding terminals of the high-voltage bus 152. For example, when charging of the traction battery 124 is desired, an external power source 136 is connected to the vehicle 112 through EVSE 138, EVSE connector 140, and charge port 134 to provide external power to charger 132. An associated controller, such as controller 250 and/or controller 148 may control contactor 236 and return contactor 238 to couple charger 132 to the high-voltage bus 152. During charge events, the main contactor 206, high-voltage return contactor 208, and the auxiliary load return contactor 210 may be closed. In some configurations, the charger 132 may be an off-board module that connects to the high-voltage bus 152 via the charge port 134. In some configurations, the charger positive terminal 222 and the charger return terminal 224 may be coupled directly to the charge port 134.

With continuing reference to FIGS. 1 and 2, one or more high-voltage loads 228 may be electrically coupled to the high-voltage bus 152. The high-voltage loads 228 may include a capacitive element 229 and a parallel impedance 231. The capacitive element 229 may hold charge and limit the decay rate of the HV-bus voltage. When disconnected from the high-voltage bus 152, the capacitive element 229 may discharge energy through the parallel impedance 231. Upon disconnection, the voltage across the high-voltage load 228 may decay toward zero. In addition, the capacitive element 229 can cause large inrush currents when not charged. Connection of the high-voltage loads 228 may be established by closing the high-voltage return contactor 208 and the main contactor 206 and/or precharge contactor 204.

An auxiliary load 226 may also be electrically coupled between the positive-side conductor 216 and the high-voltage return conductor 220. Connection of the auxiliary load 226 may be established by closing the auxiliary load return contactor 210 and the main contactor 206 or precharge contactor 204. The auxiliary load 226 may include the DC/DC converter module 128 that drives the low-voltage bus 154.

Figure 3:
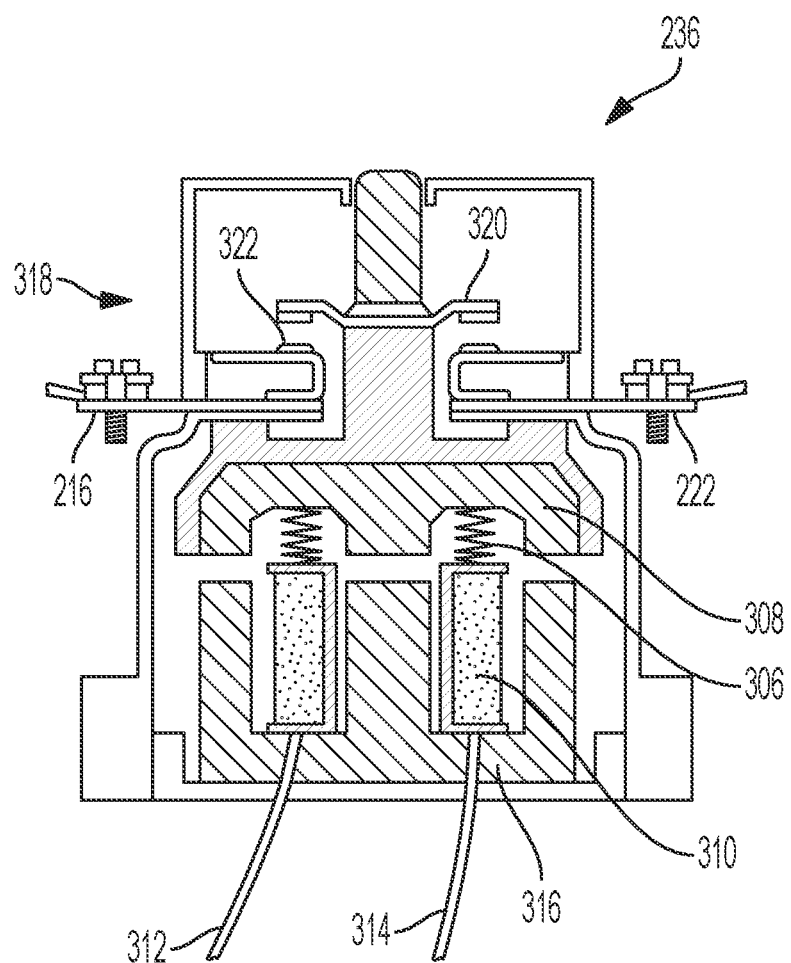
FIG. 3 illustrates a representative electromechanical high-voltage contactor of an electrified vehicle as illustrated in FIGS. 1 and 2.

The contactors 204, 206, 208, 210, 236, 238 may be electromagnetic switches as generally represented by contactor 236 illustrated in FIG. 3. The contactors may include a coil 310 that is selectively energized by a low-voltage control signal applied to control lines 312, 314 to activate an electromagnet 316 creating a magnetic force that moves the armature 308 against springs 306 to close an associated switch 318 when upper contacts 320 physically contact lower contacts 322. After initial contact with the lower contacts 322, upper contacts 320 typically exhibit a short period of switch bounce before stabilizing. The predicted closing time of contactor 236 as described herein corresponds to the time required for the upper contacts 320 to physically contact the lower contacts 322 after applying a low-voltage control signal to control lines 312, 314. Depending on the particular application and implementation, the predicted closing time may or may not include associated switch bounce or debouncing time. The present inventors have recognized that the contactor closing time varies based on temperature of coil 310 as well as the voltage of the low-voltage control signal applied to control lines 312, 314. When closed, contactor 236 electrically connects the high-voltage bus terminal 216 to the charger terminal 222.

Representative contactor 236 is a normally-open contactor such that switch 318 is opened by springs 306 when an insufficient voltage or no voltage is applied to the control lines 312, 314. In some applications, the contactor(s) may be implemented by normally-closed configurations where the springs hold the switch closed until a control signal is applied to open the switch. The construction of the contactor is generally independent of the control strategy as described herein and any of a number of commercially available contactor constructions may be used depending on the particular application and implementation. While variable closing times may be more prevalent in electromechanical contactors, in some configurations, the contactors may be solid-state devices such as an Insulated Gate Bipolar Transistor (IGBT) or similar device.

With reference to FIGS. 2 and 3, the controller 250 may be configured to drive the contactor coils using hardware components and software functions. The controller 250 may be part of the contactor module 142. In some configurations, features of the controller 250 may be performed by one or more external controllers (e.g., a battery control module controller and/or system controller 148). The controller 250 may include a processing unit for executing instructions and programs. The controller 250 may include non-transitory volatile and non-volatile memory for storing programs and data. The non-volatile memory may include a lookup table having previously stored predicted closing times for one or more contactors based on the contactor coil temperature and voltage of the low-voltage control signal. The controller may be programmed to retrieve a corresponding predicted closing time from the stored lookup table accessed or indexed by the coil temperature and the control signal voltage. The predicted closing times may be empirically determined, estimated, interpolated, or otherwise selected and stored in the memory. The coil temperature may be measured by a corresponding sensor of the coil or inferred by a sensor of a nearby vehicle component that is expected to have the same or a similar temperature. For applications where the contactor module is within the traction battery, the coil temperature may be estimated or inferred based on a measured temperature of the traction battery or cells within the traction battery.

The power distribution system 200 may include voltage sensors that are configured to measure voltages that are present. A battery voltage sensor 230 may be configured to measure a voltage across the traction battery 124 (battery voltage). A high-voltage bus voltage sensor 232 may be configured to measure a voltage across the high-voltage bus 152 (voltage across positive-side conductor 216 and the return conductor 218 (HV-bus voltage). A charger voltage sensor 234 may be configured to measure the voltage across the charger positive terminal 222 and the charger return terminal 224 or charger 132 (charger voltage). In addition, current sensors may be present that are configured to measure the current passing through conductors of the power distribution system 200. The controller 250 may include interface circuitry to properly scale and isolate the signals provided by the voltage and current sensors.

A contactor may become inoperative due to being welded closed. For example, a contactor may become welded closed when trying to close the contactor in the presence of a large voltage across the contactor. As the contactor is closed, the large voltage may cause a current flow across the switch gap before the switch is fully closed. This current may create enough heat to melt the conductive material and weld the contactor closed. Control strategies typically monitor voltage differences and inhibit contactor closing commands when the voltage difference exceeds a level that may result in welding. The present inventors have recognized that voltage variations after commanding the contactor to close may result in undesirable voltage differences across the contactor that could potentially result in contactor welding. In addition, the present inventors have recognized that the contactor closing time is affected by the contactor coil temperature and the voltage of the command signal that energizes the coil. The command signal voltage may also vary based on ambient/operating temperature of the vehicle low-voltage system. As such, the present disclosure provides a control strategy to predict the closing time of the contactor and whether the voltage difference of the connected components will be below a corresponding threshold at the predicted time of actual closing to reduce the occurrence of contact closures with a voltage difference that could result in contactor welding.

Figure 4:
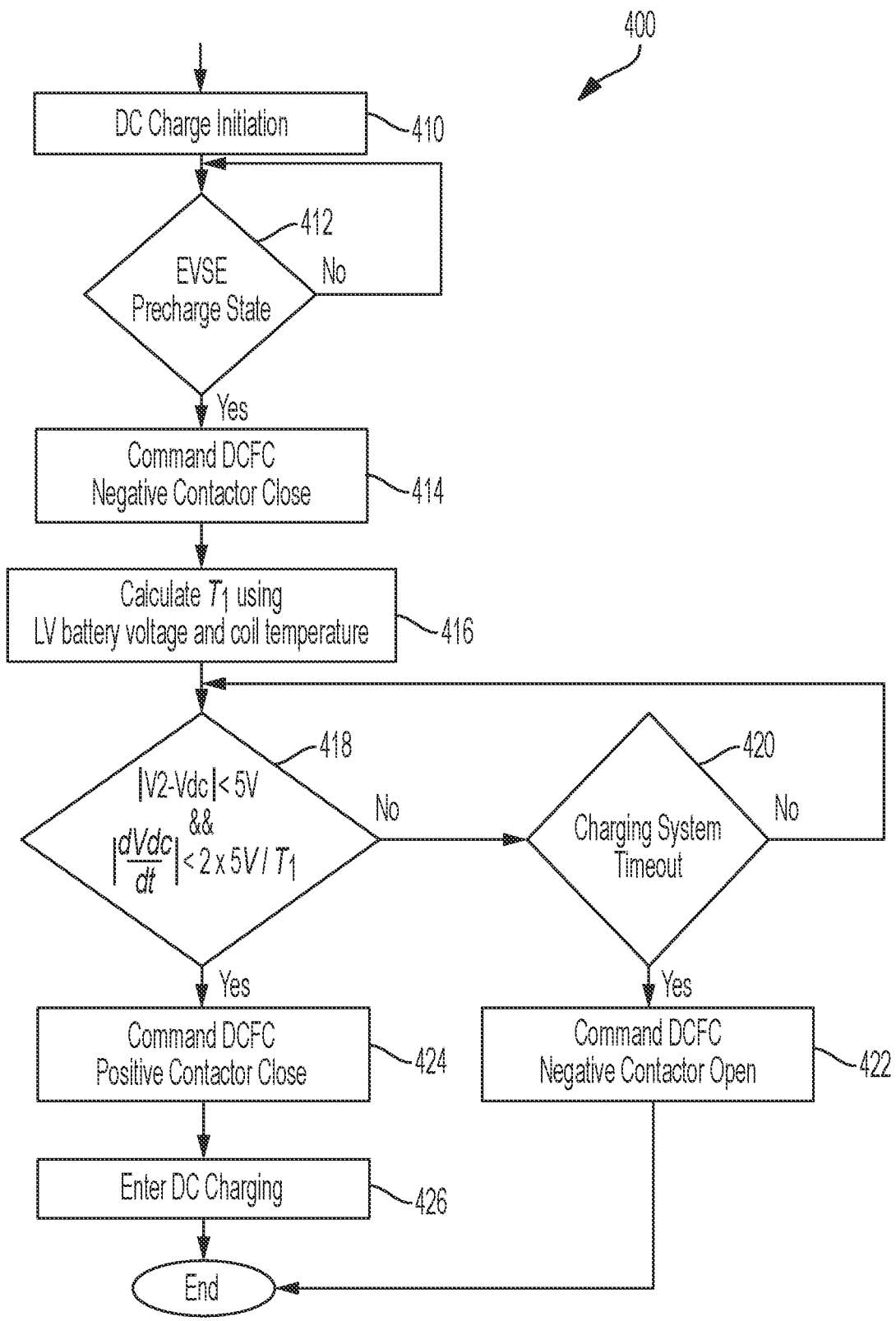
FIG. 4 illustrates operation of a system or method for controlling contactors using predicted closing time in a high-voltage vehicle power distribution system.

The charger contactors (236, 238) may be controlled during charge events. A charge event may be initiated by coupling the charge connector 140 to the charge port 134. The controller 250 may perform operations to begin charging the traction battery 124. For example, the controller 250 may initiate a precharge cycle by closing the return contactor 208, auxiliary load return contactor 210, and the precharge contactor 204 to cause the HV-bus voltage to rise to the voltage level of the traction battery 124 or a predetermined bus voltage. For example, the predetermined bus voltage may be a percentage of the traction battery voltage (e.g., 90%). When the HV-bus voltage has reached the predetermined bus voltage, the controller 250 may close the main contactor 206 and open the precharge contactor 204. The controller 250 may command the charger 132 to output a voltage that is approximately the voltage of the traction battery 124. The controller 250 may monitor the difference between the voltage ($V_2$) of the bus and the voltage (Vdc) of the charger 132, determine coil temperature of the coil of contactor 236, and determine voltage of the vehicle low-voltage bus to predict the closing time of contactor 236 and the voltage difference at the predicted closing time before generating the command to close charger contactors 236, 238. As generally illustrated in FIG. 4, the command to close contactor 238 may be generated prior to the command to close contactor 236 and without regard to the estimated closing time of contactor 238. Alternatively, the command to close contactor 236 may be generated first without regard to predicted closing time, with the command to close contactor 238 using the associated contactor closing time.

FIG. 4 illustrates operation of a system or method for controlling contactors using predicted closing time in a high-voltage vehicle power distribution system. System or method 400 includes a DC charge initiation as represented at 410. As previously described, this may include detecting connection of an external power source via EVSE connection to a charge port of the vehicle. The EVSE may communicate/negotiate various charging parameters with the vehicle controller and the vehicle may enter the EVSE precharge state as represented at 412. The vehicle precharge state may include the controller closing a precharge contactor as previously described. After completion of the EVSE precharge state at 412, the controller commands the negative contactor to close as represented at 414. A predicted contactor closing time ($T_1$) may be determined as represented at 416 based on the voltage of the low-voltage system (and corresponding low-voltage command signal when subsequently generated) and the coil temperature. The coil temperature may be directly measured or may be determined or inferred from a temperature sensor for another component. In various embodiments that include a contactor module within the traction battery, the coil temperature is determined or inferred from the traction battery temperature or the temperature of proximate battery cells of the traction battery, since most charging events occur shortly after vehicle key-off and coil temperature may be assumed to be the same as battery temperature. Alternatively, coil temperature may be based on elapsed time from vehicle key-off, or based on a linear model based on how long the coil was energized for the previous drive cycle. A lookup table may be populated with empirically determined predicted or estimated contactor closing times based on coil temperature and low-voltage bus or battery voltage. Empirically determined representative closing time values for selected coil temperatures and command voltages are shown in the table below. Other values may be determined from additional empirical measurements, interpolation, extrapolation, or other strategies for a particular application.

TABLE

Contactor Closing Time Based on Temperature and Coil Voltage

| | 8 VDC | 9 VDC | 9.5 VDC | 10 VDC | 10.5 VDC |
|---|---|---|---|---|---|
| 75° C. | | 118.8 mS | 82.0 mS | 69.3 mS | 62.1 mS |
| 23° C. | | 70.4 mS | | | |
| −40° C. | 67.2 mS | 59.1 mS | | | |

Block 418 determines whether the difference between the bus voltage ($V_2$) and the charger voltage (Vdc) will be less than a corresponding threshold at the predicted closing time. IN the embodiment illustrated in FIG. 4, this determination is based on the difference between the bus voltage and the charger voltage being less than a first threshold, which is 5 VDC in this example, in addition to the rate of change of the charger voltage $$\left(\left|\frac{dVdc}{dt}\right|\right)$$

being less than a second threshold based on the predicted closing time. In this example, the second threshold is twice the first threshold divided by the closing time, i.e. $2*5V/T_1$. In other embodiments, block 418 may determine the voltage difference across the contactor at the predicted closing time by determining whether the difference is less than the first threshold for a predetermined time period, i.e. |V2−Vdc|<5V for 500 mS. In another embodiment, the controller determines whether the voltage difference will be less than a corresponding threshold at the predicted closing time by predicting the charger voltage (and therefore the voltage difference) based on a curve fitting algorithm. For example, the voltage variation of the charger voltage ($\Delta Vdc$) in the next $T_1$, command the contactor to close when $Vdc=V2-\Delta Vdc$.

If the conditions of block 418 are not met within a predetermined timeout period as represented by block 420, then block 422 commands the negative contactor to open and the system may return a diagnostic code. Otherwise, control returns from block 420 to block 418 until the conditions are satisfied and control proceeds to block 424 to command the positive contactor to close. DC charging mode is then entered as indicated at block 426 after the contactor closes and electrically connects the charger to the high-voltage bus of the vehicle.

The representative embodiments described are not intended to encompass all possible forms within the scope of the claims. The words used in the specification are words of description rather than limitation, and it is understood that various changes can be made consistent with the teachings of the disclosure within the scope of the claimed subject matter. As previously described, one or more features of various embodiments can be combined to form further embodiments that may not be explicitly described or illustrated. Although embodiments that have been described as providing advantages over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle comprising:
   a contactor including a coil operable by a low-voltage control signal to selectively electrically couple a terminal of a high-voltage bus to a charger; and
   a controller programmed to predict a closing time of the contactor, and to generate the low-voltage control signal responsive to a difference between bus voltage and charger voltage being less than a first threshold at the predicted closing time of the contactor.

2. The electrified vehicle of claim 1 wherein the predicted closing time of the contactor is based on at least one of coil temperature and control signal voltage.

3. The electrified vehicle of claim 2 wherein the controller is programmed to retrieve the predicted closing time from a non-transitory computer readable storage medium having stored predicted closing times indexed by at least one of the coil temperature and the control signal voltage.

4. The electrified vehicle of claim 2 wherein the coil temperature is estimated.

5. The electrified vehicle of claim 4 wherein the coil temperature is estimated based on a measured battery pack temperature.

6. The electrified vehicle of claim 5 wherein the coil temperature is estimated based on the measured battery pack temperature and elapsed time from vehicle key-off.

7. The electrified vehicle of claim 1 wherein the controller is further programmed to generate the low-voltage control signal only if a rate of change of the charger voltage is less than a second threshold.

8. The electrified vehicle of claim 7 wherein the second threshold varies based on the first threshold and the predicted closing time.

9. The electrified vehicle of claim 8 wherein the second threshold corresponds to twice the first threshold divided by the predicted closing time.

10. The electrified vehicle of claim 1 wherein the controller is further programmed to predict a charge voltage change during the closing time, and wherein the control signal is generated when the charger voltage is equal to the bus voltage minus the charge voltage change.

11. A method for controlling an electrified vehicle, the method comprising, by a vehicle controller:
    predicting a closing time of a contactor operable by a control signal to selectively electrically couple a terminal of a high-voltage vehicle bus and a charger; and
    generating the control signal to close the contactor in response to a difference between a high-voltage bus and the charger coupled to the electrified vehicle being less than an associated threshold at the predicted closing time.

12. The method of claim 11 wherein predicting the closing time of the contactor comprises predicting the closing time based on temperature of a coil of the contactor and voltage of the control signal.

13. The method of claim 12 further comprising predicting the temperature of the coil based on vehicle battery pack temperature and elapsed time from a vehicle key-off.

14. The method of claim 11 further comprising predicting charger voltage at the predicted closing time.

15. The method of claim 11 wherein the control signal is generated in response to the difference between the high voltage bus and the charger is less than the associated threshold and charger voltage variation is less than a second threshold, wherein the second threshold is based on the associated threshold and the predicted closing time.

16. The method of claim 11 further comprising retrieving the closing time from a stored lookup table accessed by temperature of a coil of the contactor and voltage of the control signal.

17. An electrified vehicle, comprising:
    a high-voltage traction battery coupled to a high-voltage bus;
    a contactor including a coil operable by a low-voltage control signal to selectively electrically couple a first terminal of the high-voltage bus to a second terminal connectable to a battery charger configured to receive power from an external source; and
    a controller programmed to generate the low-voltage control signal in response to: a difference between voltage of first terminal and the second terminal being less than a first threshold, and variation of voltage at the second terminal being less than a second threshold, wherein the second threshold is based on a predicted closing time of the contactor.

18. The electrified vehicle of claim 17 wherein the predicted closing time of the contactor is predicted based on temperature of the coil and voltage of the control signal.

19. The electrified vehicle of claim 18 wherein the second threshold is a multiple of the first threshold divided by the predicted closing time of the contactor.

20. The electrified vehicle of claim 18 wherein the temperature of the coil is estimated based on temperature of the high-voltage traction battery.

* * * * *